Feb. 16, 1960

P. GUARDIGLI 2,925,543

SPEED REDUCTION SERVOSYSTEM

Filed June 20, 1956

2 Sheets-Sheet 1

Inventor
PIO GUARDIGLI

Feb. 16, 1960 P. GUARDIGLI 2,925,543
SPEED REDUCTION SERVOSYSTEM
Filed June 20, 1956 2 Sheets-Sheet 2

Inventor
PIO GUARDIGLI

United States Patent Office 2,925,543
Patented Feb. 16, 1960

2,925,543

SPEED REDUCTION SERVOSYSTEM

Pio Guardigli, Milan, Italy

Application June 20, 1956, Serial No. 592,636

Claims priority, application Italy June 21, 1955

5 Claims. (Cl. 318—27)

The present invention relates to electric apparatus for repeating to a distance angular displacements of a movable element in accordance with any law. It concerns apparatus adapted particularly but not exclusively to find application in combination with the force amplifier arrangement forming the object of British patent application No. 17,985/55, filed June 21, 1955, of the same applicant, in which combination it is adapted to transmit with perfect synchronism to the movable element of a plurality of secondary devices displacements exactly proportional to those of the movable element of a pilot apparatus.

Fundamentally, the apparatus according to the present invention is characterized in that with three groups of movable elements of a transmitter, adapted to effect, during a complete cycle of movement of the said elements, the successive closure of as many different circuits, is associated a corresponding number of fixed pole pieces of a receiver, disposed radially with respect to a wheel of movable pole pieces, the movable elements of the transmitter being established in such a manner that each of them closes the respective circuit before the circuit which precedes it in cyclic order is open, the radial axes of two fixed adjacent pole pieces of the receiver forming between them an angle obtained by the addition of an equal angle or multiple of that formed by the radial axes of two movable, adjacent pole pieces (pole pitch) plus one third of the same angle.

According to a practical embodiment of the present invention the movable pole pieces can be constituted by bars of ferro-magnetic material distributed along the rim of a wheel of non-magnetic material, parallel to its axis, in such a manner as to close, using a convenient gap, the magnetic circuit of a horseshoe core which forms fixed pole pieces and of which at least one of the branches is provided with a winding.

By way of example, but without any limitation, the accompanying drawings show schematically in its different phases of operation one embodiment of the apparatus according to the present invention.

Figure 1:
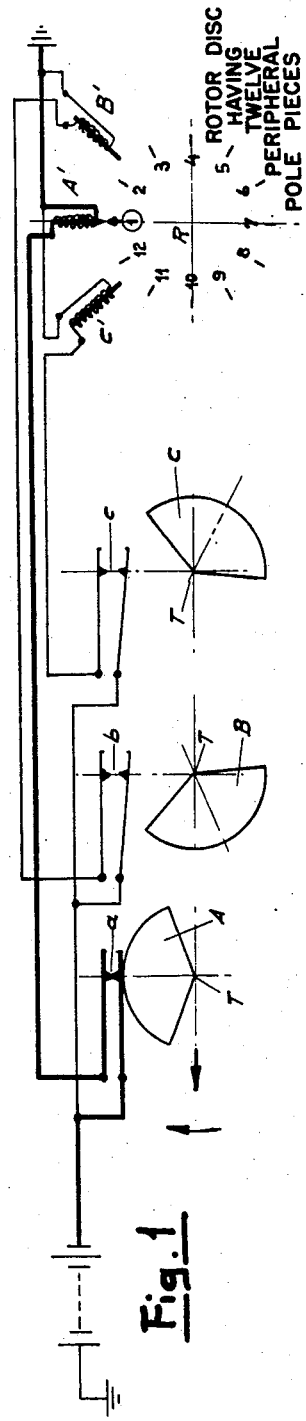
Figure 2:
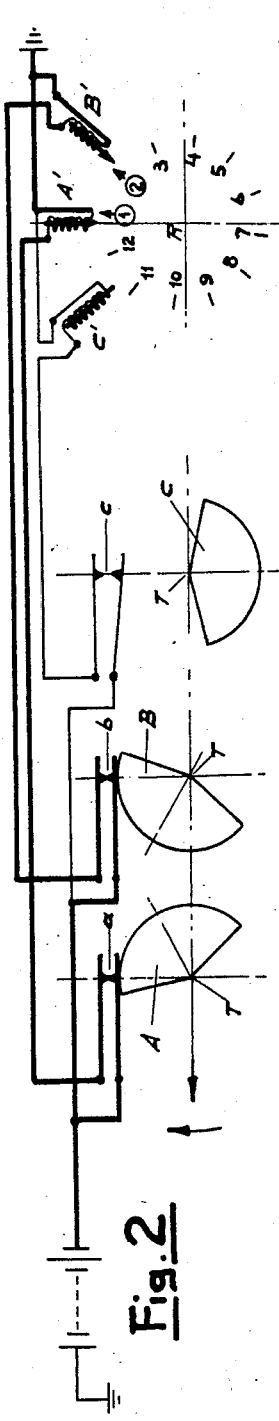
Figure 3:
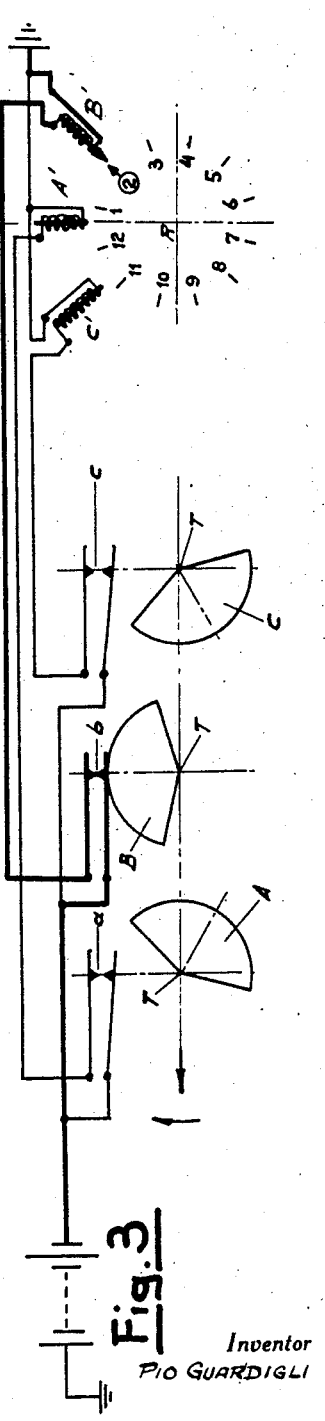
Figure 4:
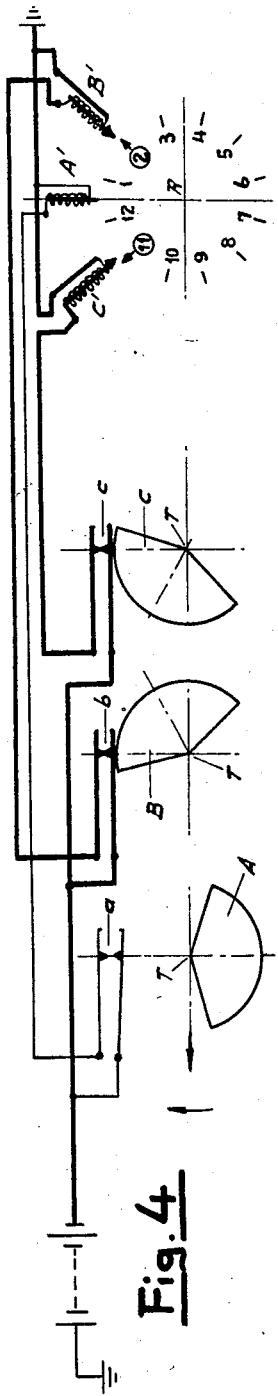
Figure 5:
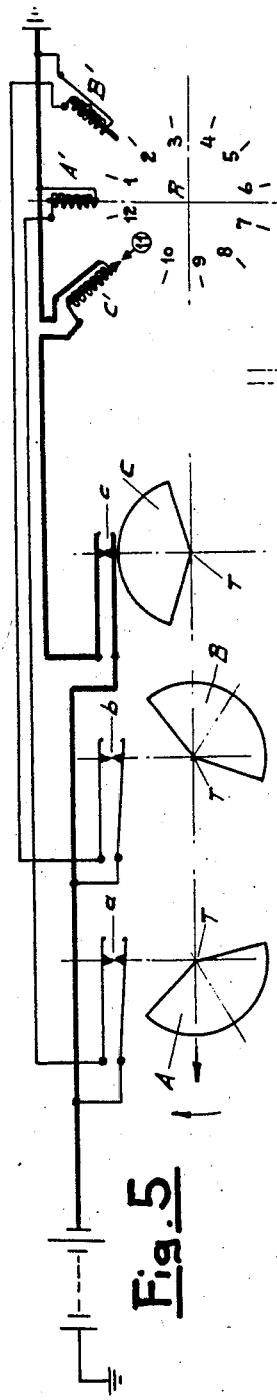
Figure 6:
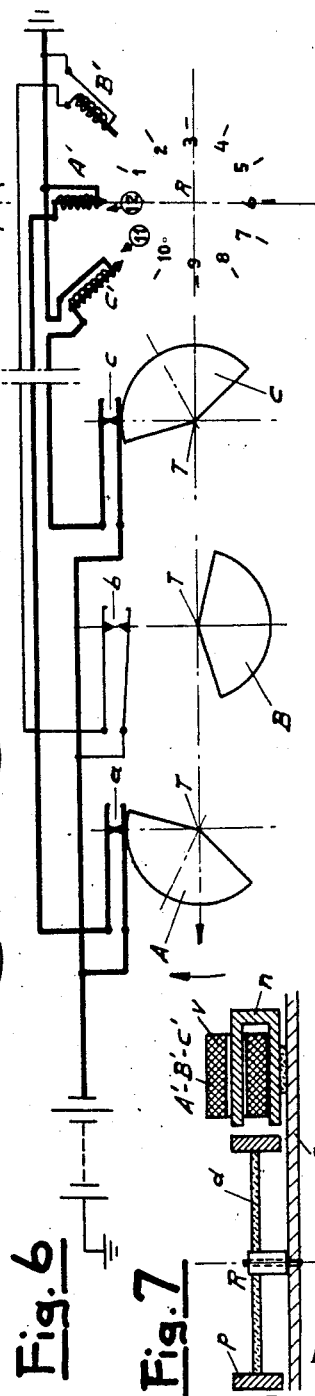
Figure 7:
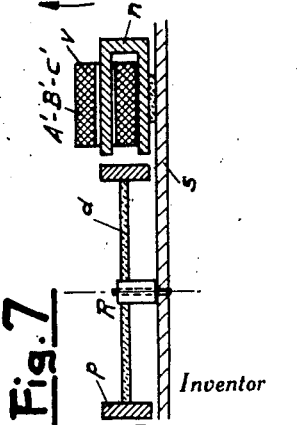

In the drawings Figs. 1 to 6 represent the six phases of a complete cycle of displacements of the apparatus seen as a whole. Fig. 7 is a cross-section through the axis of rotation of the receiver of the said apparatus.

The transmitter (Figs. 1 to 6) carries an arm of which the spindle is indicated at T presenting three identical cams A, B, C which act on the movable elements of the identical switches $a$, $b$, $c$ in three electrical circuits, the cams A, B, C being fixed on the spindle T with mutual displacements of 120°.

The width of the cams exceeds 120° by a certain quantity K such that when the arm T turns there is an interval of time during which at the moment when a contact closes, that which precedes it is not yet open, both contacts remaining closed.

The receiver (Fig. 7) is formed by a pole wheel R (which for simplicity in the drawings, only the pole pieces are indicated in Figs. 1 to 6) and by three electromagnets A′, B′, C′ forming the fixed pole pieces. The pole wheel R is constituted by a disc $d$ in non-magnetic material of small inertia (plastic material, light alloy or other substance) which carries radially along its perimeter, a ring of bar-like poles $p$ of ferro-magnetic material, these bars forming the movable pole pieces. The wheel R is mounted freely with respect to a supporting plane $s$ which is fixed to electromagnets A′, B′, C′. The bar poles $p$ are disposed with their long dimension perpendicular to the plane of the disc $d$ and they may be of any number having regard to the diameter chosen for the disc; it is only essential that their pole pitch should be constant throughout the entire turn. In the case shown there are twelve bars.

The length of the bar poles $p$ (Fig. 7) normal to the plane of the disc is such as to close with a convenient gap the magnetic circuit of the magnetic circuit of the horseshoe core $n$ of the three electro-magnets A′, B′, C′ of which one branch is provided with a winding $v$. These three electro-magnets are disposed and fixed radially about an arc of the pole wheel R. The angular distance $\epsilon$ between the magnetic spindles of two adjacent electro-magnets is determined by the expression $$\epsilon = \alpha(n + \tfrac{1}{3})$$

where $\alpha$ is the pole pitch and $n$ is a whole number indicating the number of pole pitches desired to be included between two adjacent electro-magnets.

In the schematic drawings of Figs. 1 to 6 where $n=1$, the angular distance between the spindles of two adjacent electro-magnets is $$\epsilon = \alpha + \alpha/3$$

and thus on a complete turn of 12 movable pole pieces one has also, $$\epsilon = \tfrac{1}{12}360° + \tfrac{1}{3}30° = 40°$$

As is shown in the schematic drawings of Figs. 1 to 6 the contacts $a$, $b$, $c$ controlled by the cams A, B, C are connected to the electro-magnets A′, B′, C′ respectively through feed circuits for direct current with a return to earth.

The operation is as follows: there is considered as the beginning of a cycle of operation the moment where the cam A is in a position (Fig. 1) in which it closes contact $a$ so as to bring about the excitation of the electro-magnet A′, in correspondence with which is found for example the bar pole 1. At this instant the magnetic action between 1 and A′ immobilises the disc in this position. When the arm T turns (Figs. 2) the cams A and B close the contacts $a$ and $b$ respectively. In this phase the two electro-magnets A′, B′ are thus excited at the same time and there is a combined magnetic action between these electro-magnets and the bar poles 1 and 2, these bars bringing about obviously a rotation of the disc such that it disposes itself in equilibrium between the electro-magnets A′, B′ there remaining locked until the contacts $a$ and $b$ rest at the same time closed. During subsequent rotation of T whilst the contact $b$ remains closed the contact $a$ opens and the sole electric magnet B′ (Fig. 3) is thus excited, this electromagnet bringing about a further angular displacement of the pole wheel until its position is not locked in correspondence with the position of alignment between the bar pole 2 and the magnetic axis of the electro-magnet B. Thus, by the subsequent rotation of T, there is reached the position of Fig. 4, in which whilst the contact $b$ stays closed the contact $c$ is also closed. The electromagnets B′ and C′ are then excited at the same time. The disc turns through the angle necessary to carry the movable pole pieces 2 and 11 into equilibrium at the point intermediate between the spindles of the electro-magnets B' and C'. In a succeeding time T (Fig. 5) the contact $b$ opens and only the contact $c$ remains closed so that as the electromagnet C' remains solely excited the pole wheel is constrained to a succeeding angular displacement which carries the pole 11 into correspondence with the electromagnet C'. When the position of Fig. 6 is reached, in addition to the electromagnet C', the electro-magnet A' is newly excited. In these conditions the movable pole pieces 11 and 12 are effective these pieces disposing themselves in a position intermediate the magnetic axes of the two electromagnets C' and A'. The arm of the transmitter continuing to turn returns to the position of Fig. 1 where always it is the pole piece 12 which disposes itself in correspondence with the electro-magnet A.

Over each complete cycle of the transmitter T the pole wheel is displaced therefore by one pole pitch through six successive angular displacements each of an extent equal to ⅙ of the pole pitch.

If the rotation of the transmitter T continues the receiver is displaced therefore by one pole pitch at each complete cycle of the contacts operated by the transmitter.

It is clear that at any instant and whatever relative position between the transmitter and receiver the reversal of the rotation of the transmitter brings about the same reversal of the movement of the receiver.

The principal characteristics of the transmission system described are as follows:

The receiver has mean angular speeds substantially exactly proportional to those of the transmitter;

The relationship between the mean angular speeds of the transmitter and receiver may be determined at will by convenient choice of one, or the other, or both of the following parameters:

(a) The number of cams in the circuit of the transmitter; where there is equality of the angular speed of the transmitter spindle in multiplying the number of cams the mean angular speed of the receiver is multiplied in the same measure; it is to be observed that in adopting multiple cams in accordance with a coefficient $m$, the angular displacement between the cams becomes $$\frac{120°}{m}$$

and the angular extent of each cam $$\frac{120° + K}{m}$$

where $K$ is the augmentation of the angular extent given to the cams in relation to the time in which is established the simultaneous closure of the two adjacent circuits.

(b) The number of movable pole pieces on the pole wheel of the receiver; the augmentation of the number of movable pole pieces makes smaller in the same measure the angular speed of the pole wheel; in other words the angular speed is inversely proportional to the number of poles.

The transmission takes place with a tolerance of displacement of which the angular value is constant this value being determined by $$\theta = \frac{360}{n \times 6}$$

where $n$ is the number of bar poles. In the case where the angular movement of the pole wheel is transmitted by a reducer the tolerance on the output arm is $$\theta = \frac{360}{n \times 6} \cdot \frac{1}{r}$$

$r$ being the reduction factor. In the case under examination assuming $n=12$ and $r=20$ there is a tolerance of $$\theta = \frac{360}{12 \times 6} \times \frac{1}{20} = 0.5° = 30' = \pm 15'$$

When the transmitter is arrested the receiver remains locked in the position attained since some of the electromagnets always remain excited.

The system is perfectly stable provided the speed of the pole wheel does not exceed the critical value determined by $$\frac{J\omega^2}{2} = M$$

where $$\frac{J\omega^2}{2}$$

is the driving force provided by the pole disc and M is the magnetic moment of the driving arrangement. In other words, the receiving arrangement gives a guarantee of stability and absolute fidelity of repetition when the values of J and M are such that $$\frac{J\omega^2}{2} < M$$

Provided always the type of wheel is realised in light constructive forms, it can take speeds of response sufficiently elevated.

The groups of three driving electro-magnets forming the fixed pole pieces can be multiplied according to a value permitted by their bulk and by the diameter of the pole wheel, in multiplying thus by the same value the driving couple. In this case, the corresponding bobbins are interconnected in series and in parallel and their mutual displacements in a like group are identical to those defined by a sole group.

A sole transmitter can drive any number of receivers in connecting the bobbins of corresponding electro-magnets in series or in parallel.

The number of connecting wires in direct connection between the transmitter and receiver is always of three in addition to a common return which can also be the earth; the system can always provide for intermediate devices by which the number of conductors can be reduced.

The transmitter of the impulses may be also of the induction type or electronic with a connection to the receiver by means of electro-magnetic waves.

What I claim is:

1. Electrical apparatus for translating angular displacement of a movable element at a distance comprising a transmitter having three circuits, means including three groups of movable elements for successively closing said circuits so that each circuit is closed before the preceding circuit is opened, at least one receiver including a rotor having angularly spaced movable pole pieces, and three fixed electromagnets having pole pieces disposed adjacent and radially relative to said rotor, each of said electromagnets being connected to one of said circuits, the fixed electromagnets being positioned so that the angle between the radial axes of two adjacent fixed electromagnets equals $n+⅓$ the angle between two adjacent movable pole pieces, where $n$ is a whole number representing the number of rotor pole pitches desired to be included between two adjacent electromagnets.

2. Apparatus according to claim 1, wherein the movable pole pieces of the receiver comprise magnetic members distributed at equal angular distances round the periphery of said rotor, said fixed electromagnets each including a U-shaped core positioned so that the magnetic circuit thereof is substantially closed by a magnetic member except for a suitable gap when one of said members is juxtaposed to one of said U-shaped cores, each of said U-shaped cores having a winding thereon connected to one of said three circuits.

3. Apparatus according to claim 2, wherein the rotor includes a wheel of non-magnetic material and said magnetic members are bars parallel to the axis of said wheel.

4. Apparatus according to claim 1, in which the three groups of movable elements of the transmitter comprise three cams and means for rotating said cams, said cams being angularly displaced from one another by 120 degrees, the angular extent of each cam exceeding 120° by a sufficient amount to cause two of said circuits to be closed simultaneously.

5. An apparatus according to claim 1, in which the three groups of movable elements of the transmitter comprise $n$ cams for each of said circuits, said cams being mounted on a common rotor, the angular displacement between said cams being $$\frac{120°}{n}$$

and the angular extent of said cams being $$\frac{120° + K}{n}$$

where K is an angle determining the amount of overlapping of the closure of adjacent circuits.

References Cited in the file of this patent
UNITED STATES PATENTS 2,461,511    Baecher                Feb. 15, 1949